United States Patent
Prakash et al.

(10) Patent No.: US 7,343,228 B2
(45) Date of Patent: Mar. 11, 2008

(54) TRANSIENT CANCELLATION TECHNIQUE FOR SPACECRAFT SOLAR WING STEPPING

(75) Inventors: Arun Prakash, Santa Monica, CA (US); Hanching Grant Wang, Hacienda Heights, CA (US)

(73) Assignee: The Boeing Company, Chicago, IL (US)

(*) Notice: Subject to any disclaimer, the term of this patent is extended or adjusted under 35 U.S.C. 154(b) by 507 days.

(21) Appl. No.: 10/722,756

(22) Filed: Nov. 26, 2003

(65) Prior Publication Data

US 2005/0113986 A1    May 26, 2005

(51) Int. Cl.
G05D 3/00 (2006.01)
B64C 13/00 (2006.01)
B64G 1/22 (2006.01)
G05D 1/00 (2006.01)

(52) U.S. Cl. .............. 701/13; 701/4; 701/10; 244/172.6; 244/174; 244/175; 244/195

(58) Field of Classification Search .......... 701/13, 701/10, 4; 244/172.7, 174, 194, 195, 76 A, 244/75.1, 164, 158.1, 172.6, 175; 136/292
See application file for complete search history.

(56) References Cited

U.S. PATENT DOCUMENTS

| | | | |
|---|---|---|---|
| 4,843,294 A | 6/1989 | Bhat et al. | |
| 5,520,359 A | 5/1996 | Merhav et al. | |
| 5,610,848 A | 3/1997 | Fowell | |
| 6,003,817 A * | 12/1999 | Basuthakur et al. | 244/164 |
| 6,076,773 A * | 6/2000 | Salvatore | 244/164 |
| 6,311,929 B1 * | 11/2001 | Kazimi et al. | 244/164 |
| 6,311,931 B1 | 11/2001 | Smay | |
| 6,339,734 B1 * | 1/2002 | Liu et al. | 701/13 |
| 6,481,672 B1 * | 11/2002 | Goodzeit et al. | 244/169 |
| 7,104,506 B1 * | 9/2006 | Goodzeit et al. | 244/168 |
| 2003/0098805 A1 * | 5/2003 | Bizjak | 341/139 |
| 2005/0027407 A1 * | 2/2005 | Holt et al. | 701/4 |

* cited by examiner

*Primary Examiner*—Thomas Black
*Assistant Examiner*—Christine M Behncke
(74) *Attorney, Agent, or Firm*—Gates & Cooper LLP

(57) ABSTRACT

A method and apparatus for controlling a plurality of solar panels of a spacecraft is described. The method comprises the steps of providing a first step command to a first solar panel, and providing a second step command to a second solar panel at a time of a transient zero-crossing of a dynamic response of the spacecraft body to the first step command, wherein the second solar panel is disposed on an opposite side of the spacecraft from the first solar panel. The apparatus comprises a processor; a first solar panel driver, communicatively coupled to the processor, for providing a first step command to a first solar panel, and a second solar panel driver, communicatively coupled to the processor, for providing a second step command to a second solar panel at a time of a transient zero-crossing of a dynamic response of the spacecraft body to the first step command.

30 Claims, 9 Drawing Sheets

TRANSIENT CANCELLATION TECHNIQUE FOR SPACECRAFT SOLAR WING STEPPING

CROSS-REFERENCE TO RELATED APPLICATIONS

This application is related to the following co-pending and commonly assigned patent application(s), all of which applications are incorporated by reference herein:

application Ser. No. 10/386,796, entitled "METHOD AND APPARATUS FOR STEPPING SPACECRAFT MECHANISMS AT LOW DISTURBANCE RATES," by Ketao Liu, filed on Mar. 12, 2003, issued on Jul. 12, 2005 as U.S. Pat. No. 6,917,861; and application Ser. No. 10/348,663, entitled "METHOD AND APPARATUS FOR MINIMIZING SOLAR ARRAY SUN TRACKING DISTURBANCE VIA NORTH AND SOUTH SOLAR ARRAY WING CANCELLATION," by Ketao Liu, filed Mar. 12, 2003, issued Jul. 26, 2005 as U.S. Pat. No. 6,921,048.

BACKGROUND OF THE INVENTION

1. Field of the Invention

The present invention relates generally to systems and methods for controlling spacecraft or satellites, and in particular to a system and method for stepping spacecraft mechanisms to minimize disturbances generated by the stepping mechanism.

2. Description of the Related Art

Three-axis stabilized spacecraft or satellites often include mechanisms for manipulating appendages. These mechanisms include mechanisms that rotate the antenna reflectors to specific targets, gimbals that scan a payload image frame across a specific area of the Earth's surface, and solar array drivers that step solar arrays to track the Sun. Typically, such mechanisms use simple, reliable stepper motors coupled to the spacecraft component (payloads or solar arrays) via gear-driven transmissions. Stepper motors are desirable because they are relatively simple to control, reliable, lightweight and well adapted to continuous use. The stepper motors and transmissions are used to rotate the solar array along its longitudinal axis to track the sun while the spacecraft orbits about the Earth. The rate that the solar array must be rotated is a function of the satellite orbital period. At geosynchronous orbit, this rate is about 0.004 degrees per second.

The use of a stepper motor in spacecraft with highly flexible structural components such as large deployable payload booms, antenna reflectors, and solar arrays may potentially excite some structural modes of these components and generate significant oscillation disturbances in the spacecraft itself. This disturbance can degrade the spacecraft pointing, cause excessive activity of the spacecraft control actuators, and make autonomous spacecraft momentum dumping difficult. The induced oscillation is particularly critical in spacecraft where absolute platform stability is desirable. Vibrations can cause deterioration of any inertia-sensitive operations of a spacecraft.

This disturbance problem can be alleviated by a number of techniques. One technique is to employ high bandwidth control loops to mitigate the impact of this disturbance to the spacecraft pointing. This technique, however, has significant limitations. For many spacecraft, the structural modes that are excited by the stepping mechanisms are outside of the spacecraft control bandwidth. Consequently, these high-bandwidth control loops have only very limited effects on the disturbance. Further extension of the bandwidth of the control loops to include these structural modes will very often result in control loop stability problems. Furthermore, high-bandwidth control also unnecessarily increases actuator operation, which can increase wear and result in excess energy consumption.

Another technique for mining the solar array drive stepping disturbance is disclosed in U.S. Pat. No. 4,843,294, entitled "Solar Array Stepping to Minimize Array Excitation," issued Jun. 27, 1989 to Bhat et al, which is hereby incorporated by reference herein. In this reference, mechanical oscillations of a mechanism containing a stepper motor, such as a solar array powered spacecraft, are reduced and minimized by the execution of step movements in pairs of steps. The period between steps is equal to one-half of the period of torsional oscillation of the mechanism. While this method can reduce structural disturbances, it is not very effective when the mechanism has significant backlash and stiction. This is because the backlash and stiction can significantly interrupt the two-step pattern of this method.

Another technique is described in co-pending and commonly-assigned patent application Ser. No. 10/386,796, entitled "METHOD AND APPARATUS FOR STEPPING SPACECRAFT MECHANISMS AT LOW DISTURBANCE RATES," by Ketao Liu, filed on Mar. 12, 2003, in which transients due to the interaction between appendage stepping and resonances are reduced by deadbeating at a half resonance cycle between the North and South wings. This technique, however, is subject to frequency sensitivities and uncertainties, and cannot be implemented in all existing spacecraft.

Still another technique is described in co-pending and commonly-assigned patent application Ser. No. 10/348,663, entitled "METHOD AND APPARATUS FOR MINIMIZING SOLAR ARRAY SUN TRACKING DISTURBANCE VIA NORTH AND SOUTH SOLAR ARRAY WING CANCELLATION," by Ketao Liu, filed Mar. 12, 2003. The technique, however, is a more cumbersome implementation.

There is therefore a need for a system and method for minimizing disturbances in stepper-motor driven mechanisms that are more robust to mechanism backlash and stiction. The present invention satisfies that need.

SUMMARY OF THE INVENTION

The present invention is a method and apparatus for controlling a plurality of solar panels of a spacecraft. The method comprises the steps of providing a first step command to a first solar panel, and providing a second step command to a second solar panel at a time of a transient zero-crossing of a dynamic response of the spacecraft to the first step command, wherein the second solar panel is disposed on an opposite side of the spacecraft from the first solar panel. The apparatus comprises a processor, a first solar panel driver, communicatively coupled to the processor, for providing a first step command to a first solar panel, and a second solar panel driver, communicatively coupled to the processor, for providing a second step command to a second solar panel at a time of a transient zero-crossing of a dynamic response of the first solar panel to the first step command.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description of the preferred embodiment, reference is made to the accompanying drawings, which form a part hereof, and in which is shown byway of illustration a specific embodiment in which the invention may be practiced. It is to be understood that other embodiments may be utilized and structural changes may be made without departing from the scope of the present invention.

Figure 1:
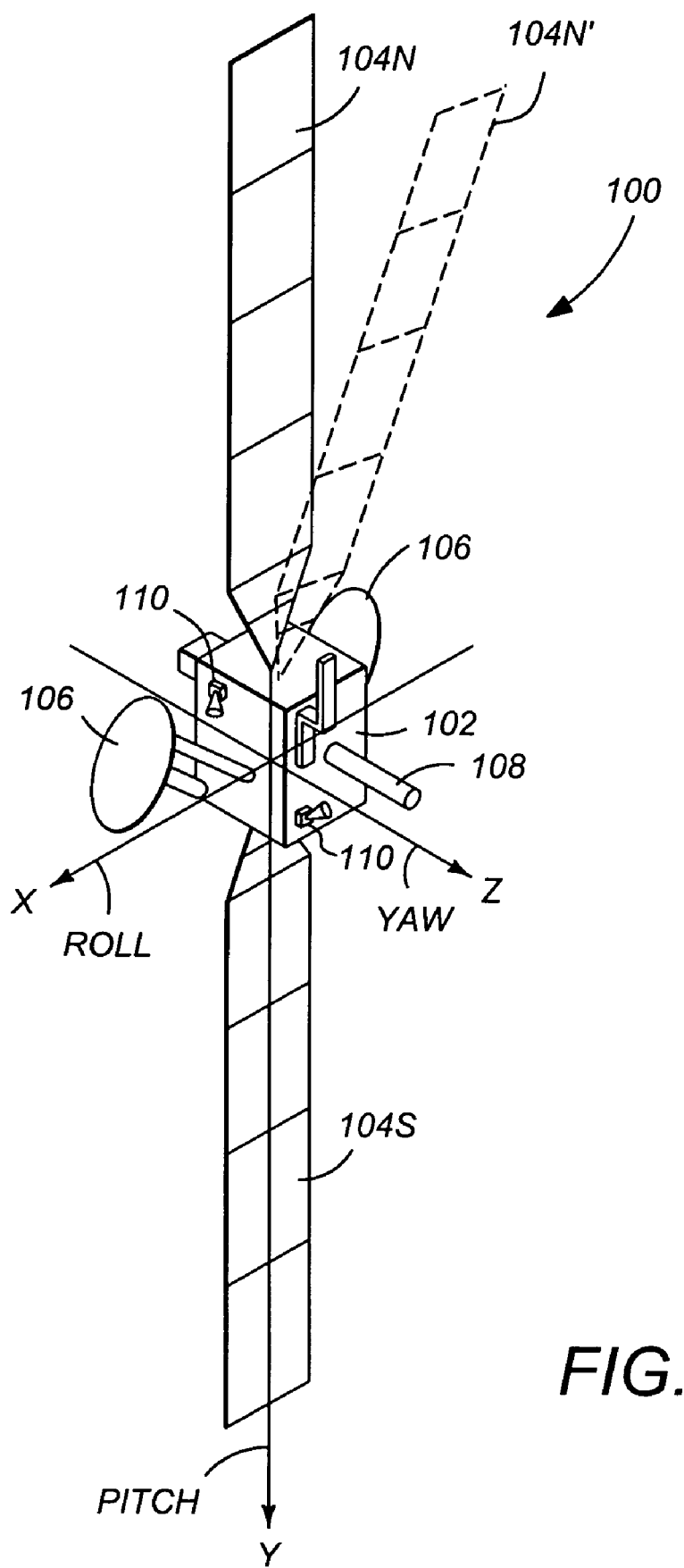
FIG. 1 is a diagram depicting a typical spacecraft.

FIG. 1 depicts a three-axis stabilized satellite or spacecraft 100. The spacecraft 100 is preferably situated in a stationary orbit about the Earth. The spacecraft 100 has a main body 102, a pair of solar panels or wings 104N and 104S (hereinafter referred to collectively as solar panel(s) or wing(s) 104), a pair of high gain narrow beam antennas and their reflectors 106, and a scanning payload 108 which can be used to scan a specific area of Earth surface. The spacecraft 100 may also include one or more sensors 110 to measure the attitude of the spacecraft 100. These sensors 110 may include sun sensors, earth sensors, and star sensors. Since the solar panels are often referred to by the designations "North" and "South", the solar panels 104 in FIG. 1 are referred to by the numerals 104N and 104S for the "North" and "South" solar panels, respectively.

The three axes of the spacecraft 100 are shown in FIG. 1. The pitch axis Y lies along the plane of the solar panels 104N and 104S. The roll axis X and yaw axis Z are perpendicular to the pitch axis Y and lie in the directions and planes shown. The antenna 108 points to the Earth along the yaw axis Z.

One or more of the solar panels 104 can be rotated about the pitch axis and can be tilted towards the plane formed by the roll and yaw axes. This is depicted in FIG. 1 as tilted position 104N'.

Figure 2:
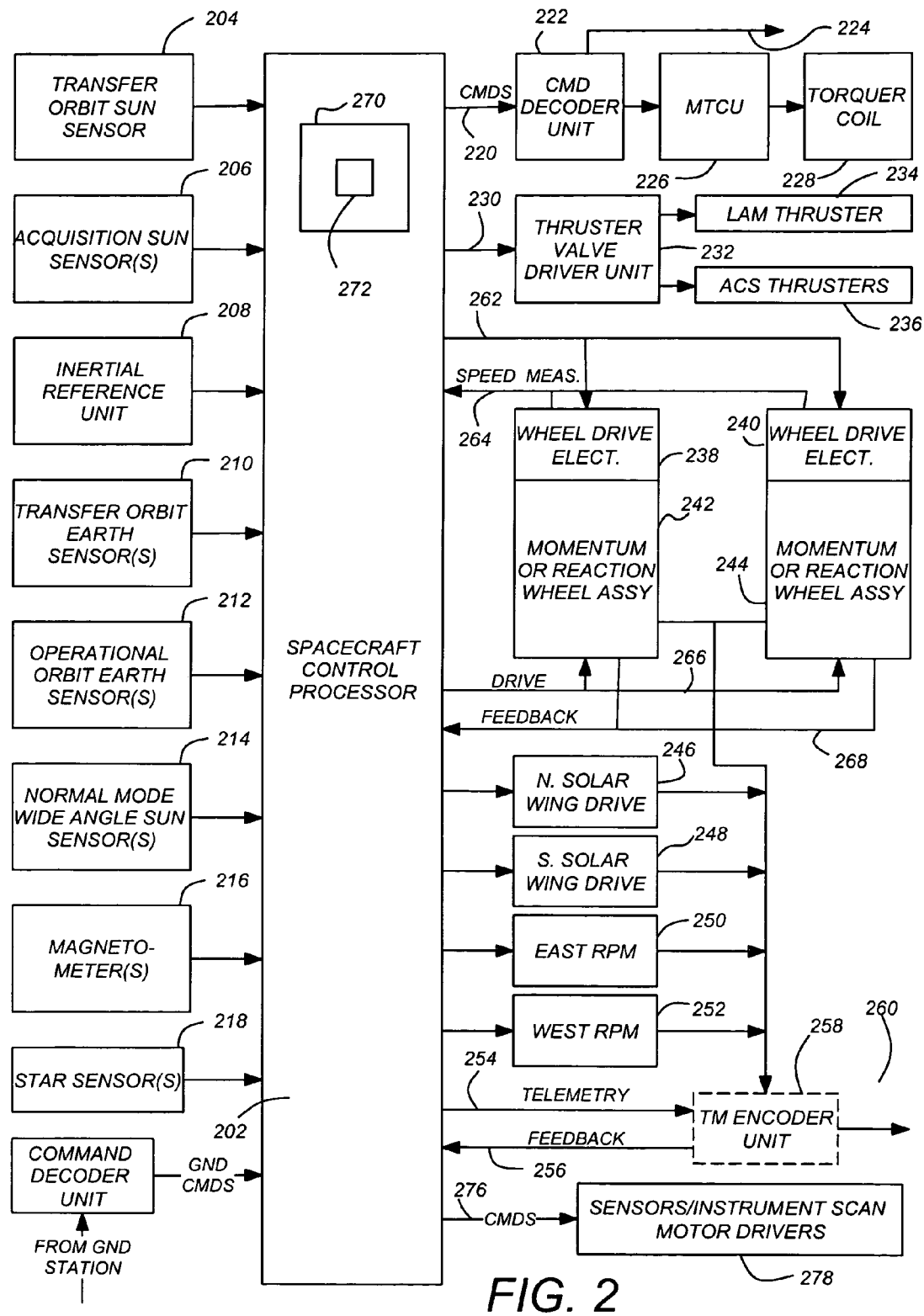
FIG. 2 is a block diagram depicting a satellite control system.

FIG. 2 is a diagram depicting the functional architecture of a representative attitude control system. Control of the spacecraft is provided by a computer or spacecraft control processor (SCP) 202. The SCP 202 performs a number of functions which may include post ejection sequencing, transfer orbit processing, acquisition control, station keeping control, normal mode control, mechanisms control, fault protection, and spacecraft systems support, among others. The post ejection sequencing could include initializing to ascent mode and thruster active nutation control (TAN %. The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The station keeping control could include auto mode sequencing, gyro calibration, station keeping attitude control and transition to normal mode. The normal mode control could include attitude estimation, attitude and solar array steering, momentum bias control, magnetic torquing, and thruster momentum dumping (H-dumping). The mechanisms' mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit 222 operates the load shedding and battery charging systems 224. The command decoder unit 222 also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Generally, the spacecraft 100 may use thrusters, momentum/reaction wheels, or a combination thereof to perform spacecraft attitude control.

Wheel torque commands 262 are generated by the SCP 202 and are communicated to the wheel drive speed electronics 238. These effect changes in the wheel speeds for wheels in reaction wheel assembly 242. The speed of the wheels is also measured and fed back to the SCP 202 by feedback control signal 264.

The SCP 202 communicates with the telemetry encoder unit 258, which receives the signals from various spacecraft components and subsystems indicating current operating conditions, and then relays them to the ground station 260.

The wheel drive electronics 238 receive signals from the SCP 202 and control the rotational speed of the reaction wheels.

Other spacecraft could employ momentum wheels, external torquers, chemical or electric thrusters, magnetic torquers, solar pressure, etc. This includes momentum bias spacecraft that attempt to maintain the spacecraft body fixed and steer payload elements with payload gimbals.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft control processor 202 to perform the steps necessary to implement and/or use the present invention. Computer program and/or operating instructions may also be tangibly embodied in memory 270 and/or data communications devices (e.g., other devices in the spacecraft 100 or on the ground), thereby making a computer program product or article of manufacture according to the present invention. As such, the terms "program storage device," "article of manufacture" and "computer program product" as used herein are intended to encompass a computer program accessible from any computer readable device or media.

Figure 3:
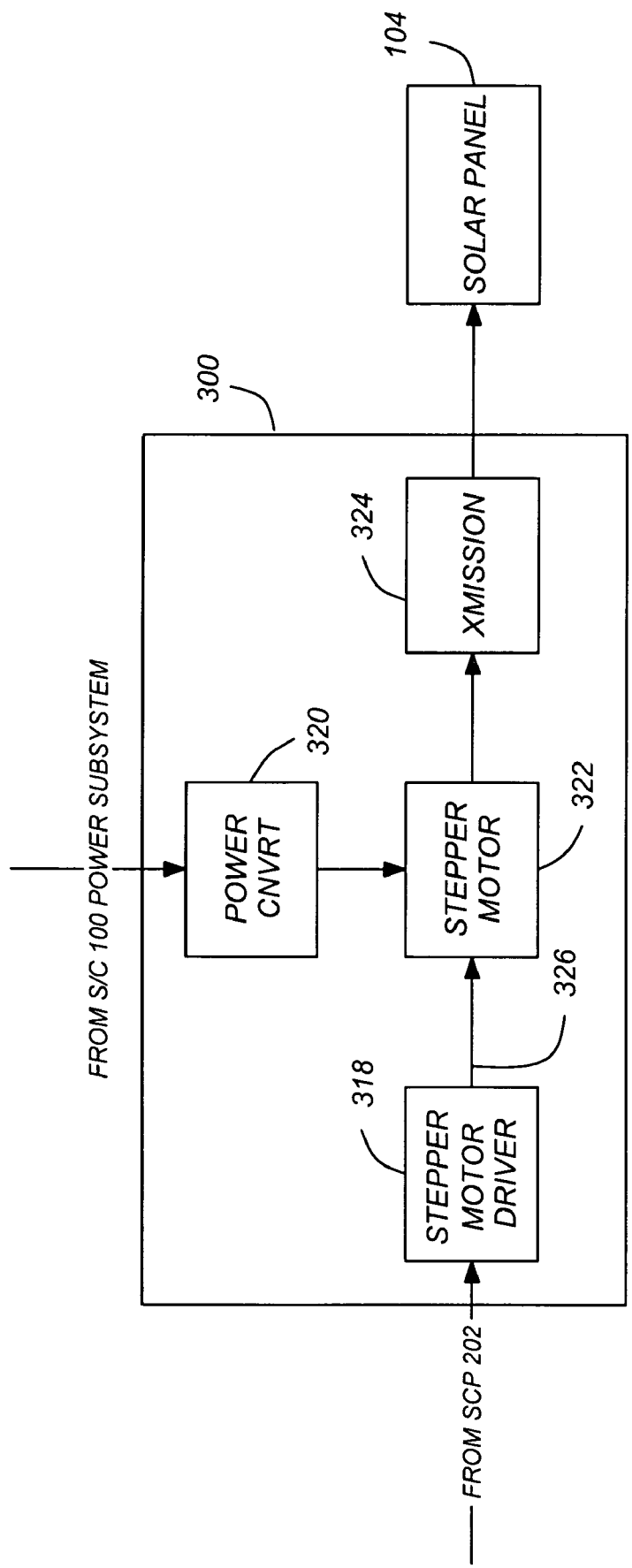
FIG. 3 is a block diagram depicting a stepper motor mechanism usable to manipulate a solar panel to track the Sun.

FIG. 3 is a block diagram of a appendage driver 300 that can be used to implement the North solar wing driver (SWD) 246 or the South SWD 248, the East RPM 250 or the West RPM 252, or the payload scanning gimbals (not shown). An appendage 324 such as the antenna reflector 106E or 106W, solar panel 104N or 104S, or scan payload 108 (hereinafter alternately referred to as antenna reflector(s) 106 and solar panel(s) 104) is driven by the transmission 324, which in turn is coupled to a stepper motor 322. The transmission 324 converts the rotational output of the stepper motor 322 into appropriate appendage motion. The stepper motor 322 is provided with a suitable power source such as the spacecraft power subsystem to supply driving force to the gear assembly 324. Power from the spacecraft power subsystem may be conditioned by power conditioner 320. A stepper motor driver 318 provides the input signal by appropriate signal lines 326 to the stepper motor 322. The stepper motor driver 318 is controlled by the SCP 202 from which necessary step timing and step rate can be derived for the function applied to the stepper motor 322. The driver 318 may include the North SWD 246, the South SWD 248, the East RPM 250, the West RPM 252 or the payload scanning gimbals.

During flight, both the North solar wing 104N and the south solar wing 104S are rotated about their longitudinal axes to direct the planar surface of the solar collectors in the direction of the Sun. Typically, the north solar wing 104N and the south solar wing 104 are stepped simultaneously. This is not problematic if the solar wings 104 are diametrically opposed from one another relative to the spacecraft 100 center of mass and are not tilted, and the solar wing 104 pitch inertia is small.

In some applications, however, in order to derive maximum energy from the Sun, the solar wings 104 must also be tilted away from the pitch axis and toward the plane defined by the roll and yaw axes by as much as 23 degrees plus orbit inclination. When the solar wings 104 are tilted, there is a relatively large inertia in the pitch axis, and a relatively large inertia coupling from the pitch axis to the roll and yaw axes. In these circumstances, solar wing drive stepping in the pitch axis causes a relatively large momentum exchange between the solar wing 104 and the spacecraft main body 102. This induces larger spacecraft pointing transients and larger wheel torque dithering in the roll, pitch, and yaw axes. Large pointing transients degrade payload performance, and larger wheel torques reduce the reliability of the momentum wheels.

These problems can be alleviated by spreading the stepping of the solar wings such that the induced transients are temporally spread and do not sum together. Further, an optimal time lag between the solar wing stepping commands can be derived such that transients due to the stepping of one of the solar wings 104 cancels the transients induced by the stepping of the other solar wings. The optimal time lag depends on the time constant of the spacecraft 100 attitude control system using the reaction wheels and the time constant of the appendage driver 300 and the appendage 324. This is equivalent to the time the spacecraft attitude control system brings the transient in the reverse direction (e.g., the transient zero crossing).

The relative stepping time lag between a first solar wing (e.g. the North solar wing 104N) and a second solar wing (104S) can be implemented by applying a bias angle to the angular command $\theta^{cmd}$ to the solar wing driver 246, 248, or by applying a similar bias angle to the measured angular position of the solar wing 104. This bias angle, $\theta^{bias}$, can be computed as $\theta^{bias} = \Delta t \cdot \omega_{str}$, wherein $\theta^{bias}$ is the transient cancellation bias angle, $\Delta t$ is the time lag of the transient zero crossing and $\omega_{str}$ is the nominal Sun tracking rate.

Figure 4:
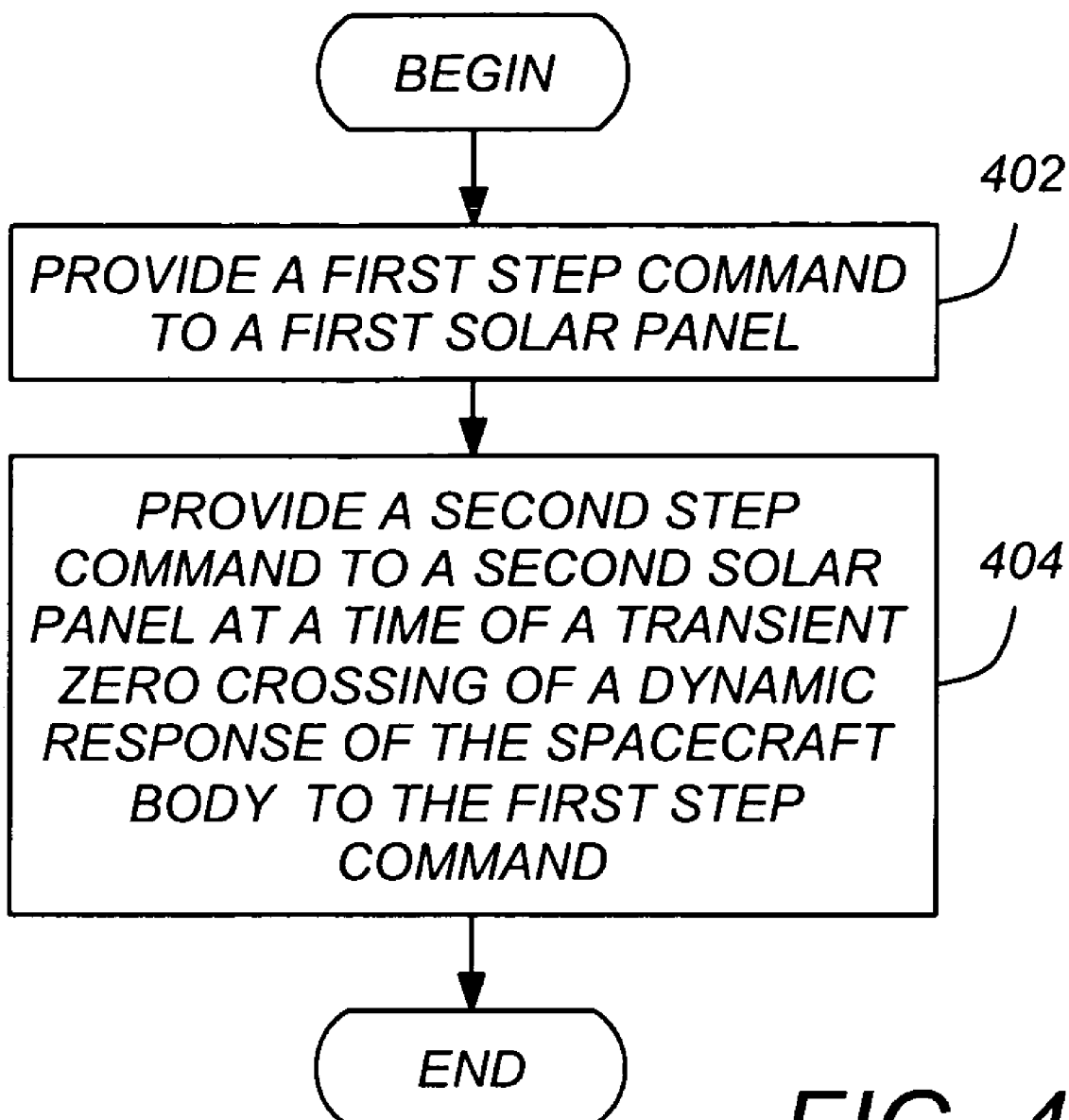
FIG. 4 is a flow chart depicting exemplary process steps used to reduce step-induced transients.

FIG. 4 is a flow chart depicting exemplary process steps used to reduce step-induced transients of the spacecraft body 102. A first step command is provided to a first solar panel 104 such as solar panel 104N, as shown in block 402.

Figure 5:
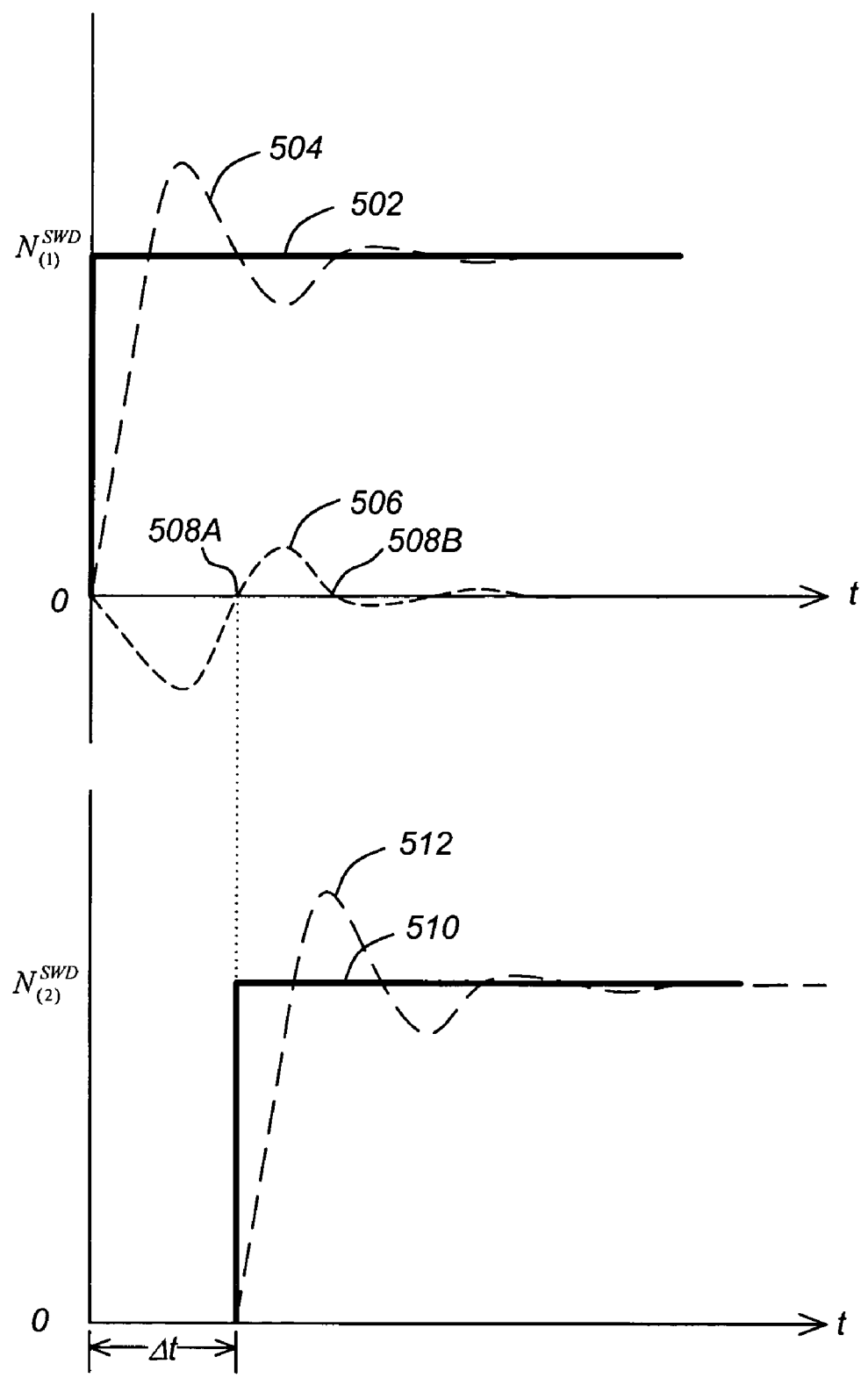
FIG. 5 is a diagram showing the transient response of a solar panel to a step command.

FIG. 5 is a diagram showing the transient response of the first solar panel 104N to the step command. The first step command 502 is provided at time $t=t_0$, and the dynamic response of the solar panel 104N is indicated as trace 504. The dynamic response includes a steady state value (nominally equal to the step command $N_{(1)}^{swd}$) and a transient response.

Because the solar panel 104N is coupled to the spacecraft body 102 and may be tilted, the dynamic response of the solar panel 104N induces spacecraft 100 motion as well. This motion, the spacecraft body 102 transient response, 506 includes one or more zero crossings such as zero crossings 508A and 508B.

Returning to FIG. 4, a second step command 510 is provided to a second solar panel such as solar panel 104S. The step command is provided at a time $t=t_0+\Delta t$ that the spacecraft body 102 transient response 506 to the first step command $N_{(1)}^{swd}$ crosses zero at location 508A. This is shown in block 404, and results in a dynamic response of the second solar panel 104S as shown in trace 512.

Figure 6A:
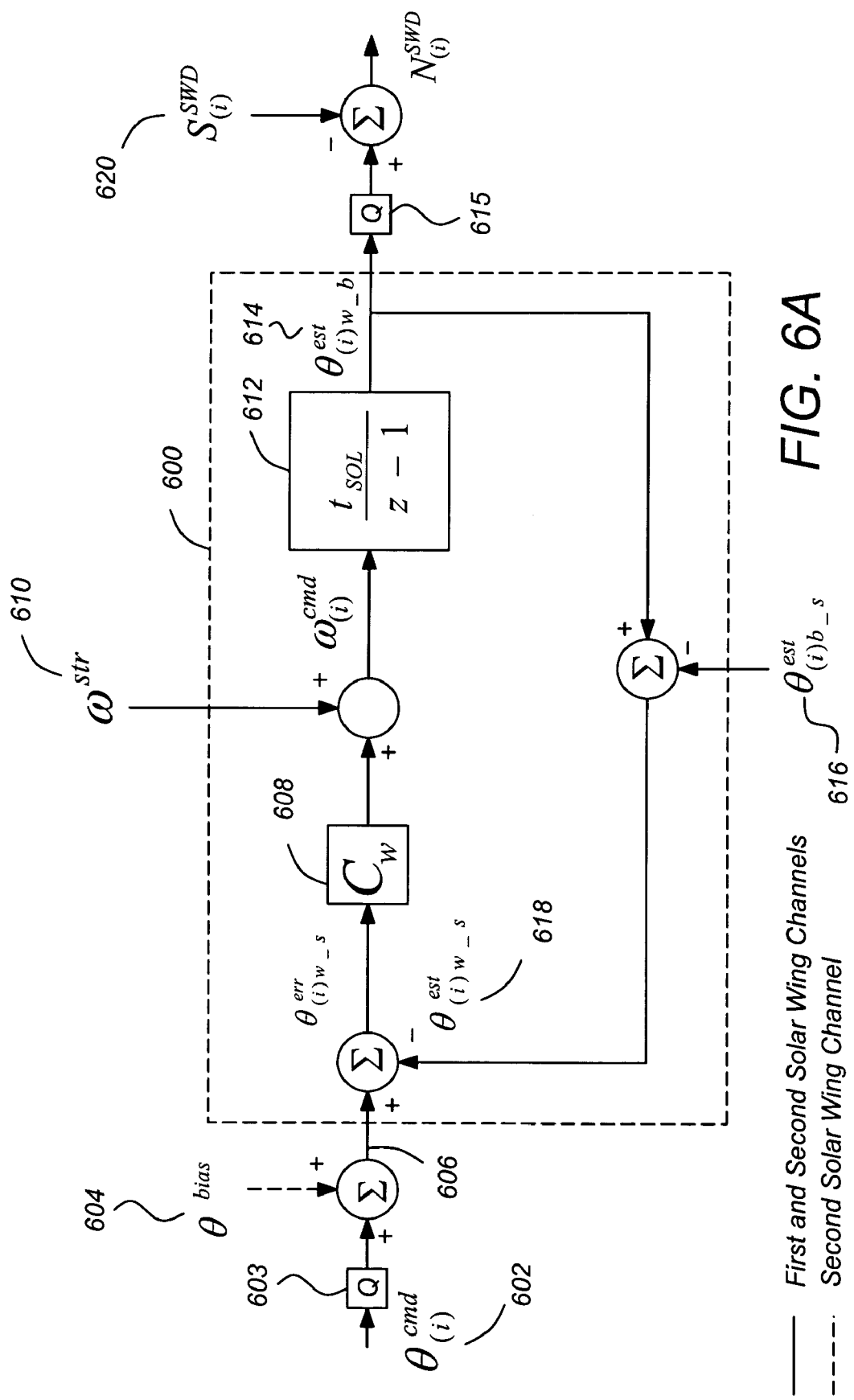
FIG. 6A is a diagram showing a solar wing position estimation and control system.

FIG. 6A is a block diagram illustrating a solar wing 104 position estimation and control system 600 that can be used to implement the foregoing technique. In FIG. 6A:

$\theta_{(i)w\_b}^{est}$ 614 is an estimated solar wing to spacecraft body 102 angle at each step (i);

$\theta_{(i)b\_s}^{est}$ 616 is an estimated Sun to spacecraft body 102 angle at each step (i);

$\theta_{(i)}^{cmd}$ 602 is an existing commanded bias angle, for example, for environmental torque balancing, at each step (i) (this is not a final command sent to the solar wing drive);

$C_w$ 608 is an angular error to angular rate update gain;

$\omega^{str}$ 610 is a solar wing Sun tracking rate; and $t_{SOL}$ is a time period between instantiations (i) of the estimation and control system 600; and z is the inherent variable of the Z-transform operator.

Figure 6B:
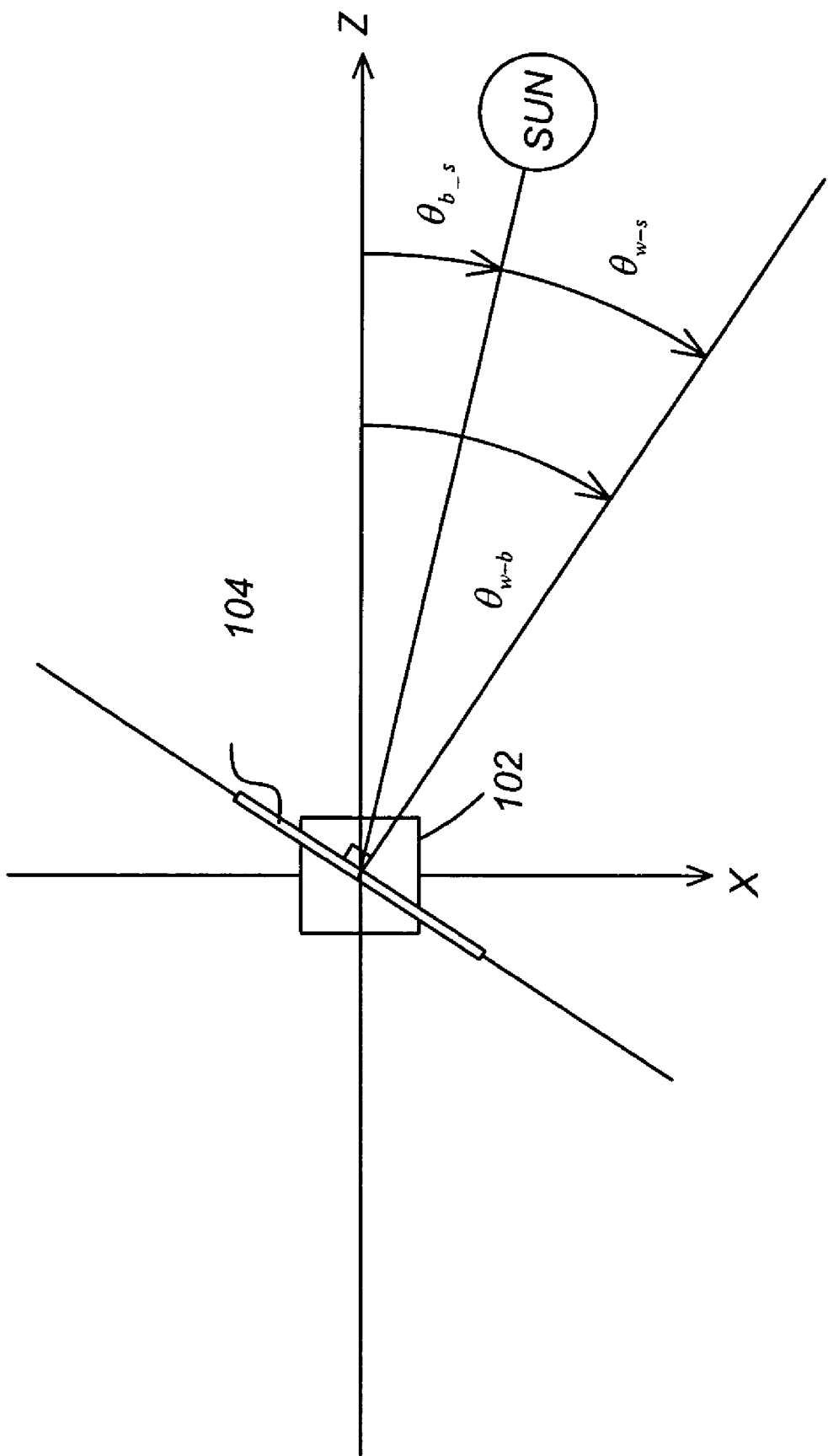
FIG. 6B is a diagram showing a view of the spacecraft from above.

FIG. 6B is a view of the spacecraft 100 from above, illustrating solar wing to spacecraft body and the Sun to spacecraft body angles ($\theta_{w\_b}$, and $\theta_{b\_s}$, respectively) in the roll/yaw plane.

Returning to FIG. 6A, an (existing) commanded wing bias angle $\theta^{cmd}$ 602 is quantized by quantizer 603. As described further below, in one embodiment, the commanded wing bias angle $\theta^{cmd}$ 602 is quantized to a least significant bit equal to the step size, and to the value of the nearest step. The quantized commanded wing bias angle is compared to an estimated position of the solar wing relative to the Sun, or the wing to Sun angle $\theta_{(i)w\_s}^{est}$ 618 to determine the wing position error $\theta_{(i)w\_s}^{err}$. The wing to Sun angle $\theta_{(i)w\_s}^{est}$ 618 is the difference between an estimated Sun to spacecraft 100 body angle $\theta_{(i)b\_s}^{est}$ 616 and the desired wing to body angle $\theta_{(i)w\_b}^{est}$ 614.

The estimated Sun to spacecraft 100 body angle $\theta_{(i)b\_s}^{est}$ 616 is typically determined by a separate subsystem or algorithm in the SCP 202, and can be computed by measuring the position of the Sun (with a Sun sensor 206, for example), by computing the Sun position from ephemeris data, or a combination of both techniques.

The wing position error $\theta_{(i)}^{err}$ is applied to a position gain $C_w$ 608. This value is added to the solar wing Sun tracking rate $\omega_{str}$ 610, which is a nominal (error free) solar wing 104 angular rate required to keep the solar wing 104 directed at the Sun. The value of $\omega_{str}$ 610 is typically computed from the orbital rate of the spacecraft 100. The desired angular rate, $\omega_{(i)}^{cmd}$, is converted to the desired solar wing angular position $\theta_{(i)w\_b}^{est}$ 614 by integrating through the step interval $t_{SOL}$, as shown in block 612. The desired solar wing angular position $\theta_{(i)w\_b}^{est}$ 614 is quantized by second quantizer 615.

A current solar wing angular position relative to the spacecraft body 102, $S_{(i)}^{SWD}$ 620 is subtracted from the quantized desired solar wing angular position $\theta_{(i)w\_b}^{est}$ 614 to arrive at the step command provided to the solar wing drives 246, 248. The current solar wing angular position can be measured by appropriate sensors in the transmission 324, on a shaft coupling the solar wing 104 to the transmission 324, or may be determined by bookkeeping the number of step commands provided to the drive 246, 248.

Since the angular position of the solar wing is commanded in term of a plurality of steps (i), the equations used to determine the number of steps to be taken for both the North solar wing 104N and the South solar wing 104S are as follows:

$$\theta_{(i)w\_s}^{est} = \theta_{(i)w\_b}^{est} - \theta_{(i)b\_s}^{est} \quad \text{Equation (1)}$$

$$\theta_{(i)}^{err} = \theta_{(i)}^{cmd} - \theta_{(i)w\_s}^{est} \quad \text{Equation (2)}$$

$$\omega_{(i)}^{cmd} = C_w \theta_{(i)}^{err} + \omega^{str} \quad \text{Equation (3)}$$

$$\theta_{(i)}^{est} = \theta_{(i-1)}^{est} + \omega_{(i)}^{cmd} t_{SOL} \quad \text{Equation (4)}$$

$$N_{(i)}^{swd} = N_{(i-1)}^{swd} + \omega_{(i)}^{cmd} \frac{t_{SOL}}{\Delta\theta^{swd}} - S_{(i)}^{swd} \quad \text{Equation (5)}$$

where $N_{(i)}^{swd}$ is the number of steps the solar wing 104 must take to achieve the desired solar wing angle (e.g. the steps sent to the solar wing drive); $\Delta\theta^{swd}$ is the angular displacement of the solar wing per step (i), in radians.

Both solar wings 104N and 104S use the same Sun position (whether obtained by Sun sensor measurement or ephemeris prediction) to determine the spacecraft body to sun angle $\theta_{(i)b\_s}^{est}$ 616. This ordinarily results in SWD 246, 248 commands that step each solar wing 104N and 104S at the same time. This technique is referred to as synched stepping. As described above, synched stepping, however, can result in undesirable momentum exchanges between the solar wings 104 and the spacecraft body 102.

To alleviate this problem, the step commands applied to the second solar wing (e.g. solar wing 104S) are time-delayed by a value $\Delta t$ so that the spacecraft body 102 transients that result from stepping the first solar wing (e.g. solar wing 104N) are effectively canceled by spacecraft body 102 transients arising from appropriately timed stepping of the second solar wing 104S. This time delay can be implemented by adding a transient cancellation bias angle $\theta^{bias}$ 604 to the commanded wing bias angle $\theta^{cmd}$ for second solar wing 104, as shown in FIG. 6A.

Figure 7:
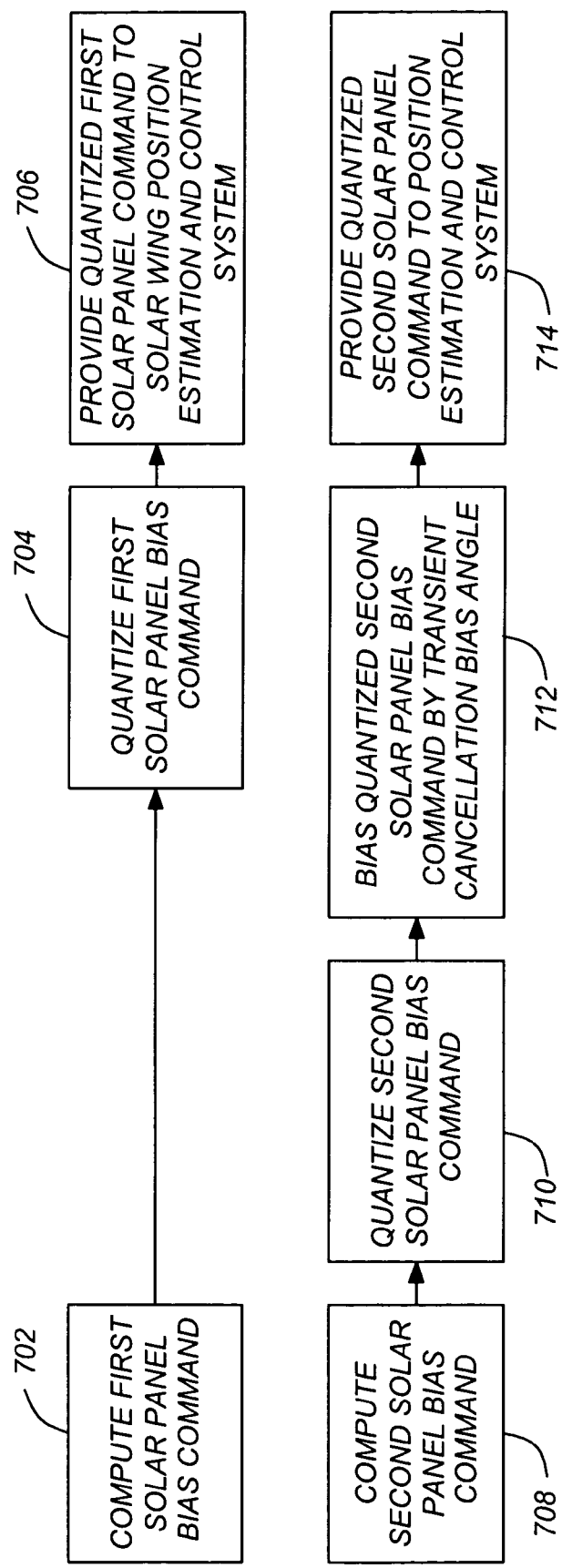
FIGS. 7 and 8 are diagrams illustrating how transient cancellation bias may be implemented by appropriate quantization of the solar panel commands.
Figure 8:
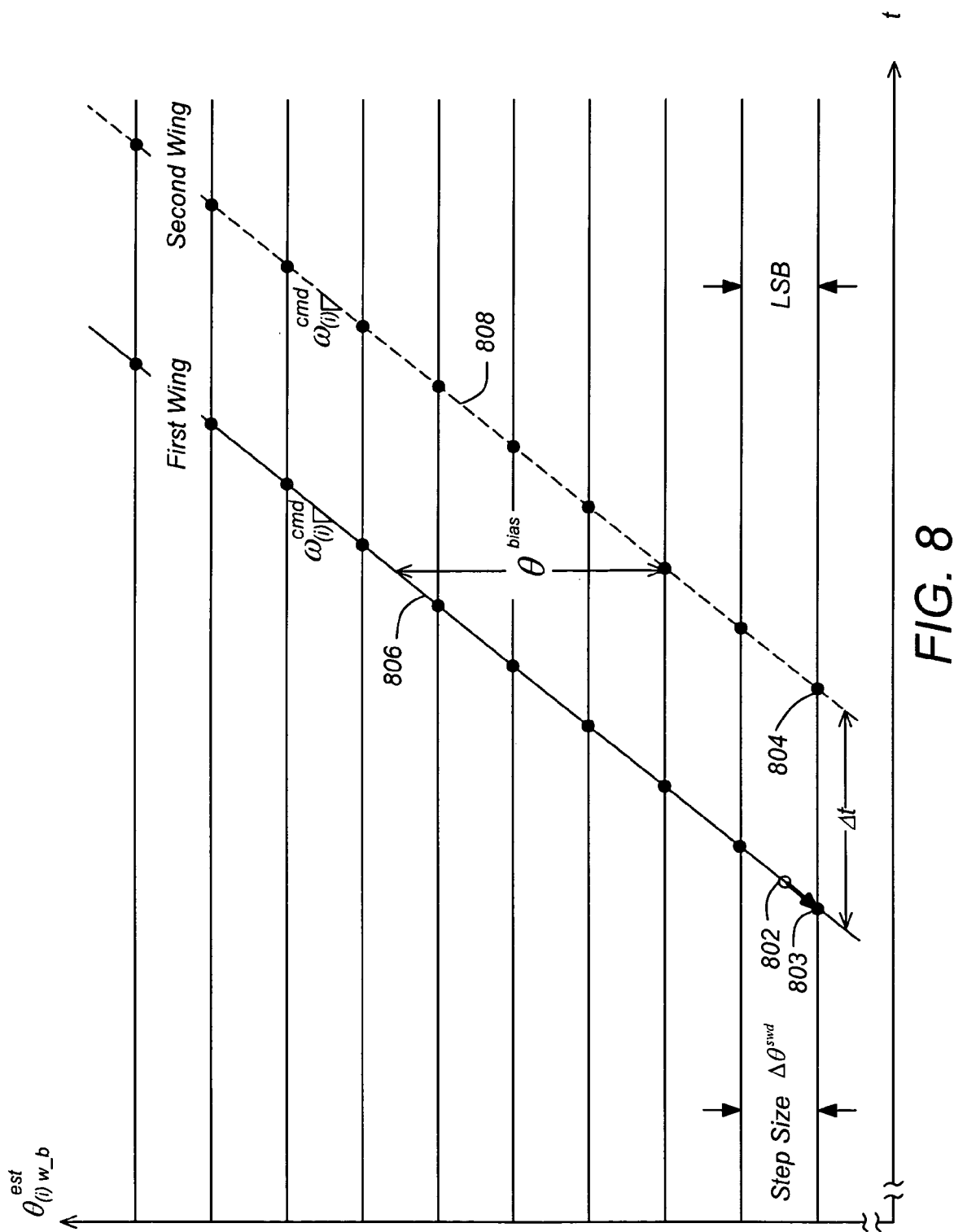

FIGS. 7 and 8 are diagrams illustrating how the requisite transient cancellation bias angle $\theta^{bias}$ 604 can be implemented by appropriately quantizing the solar panel bias commands. A first wing bias angle command $\theta^{cmd}$ 602 is computed (for example, for environmental torque balance), as shown in block 702. The wing bias angle command $\theta^{cmd}$ 602 for the first solar panel 104N is then quantized to the nearest step such that the least significant bit (LSB) equals the SWD 246,248 step size $\Delta\theta^{swd}$. This is shown in block 704. The computed wing bias angle command $\theta^{cmd}$ 602 is quantized to the nearest steps 803 with the LSB equal to the step size $\Delta\theta^{swd}$. This quantized first solar panel bias command is provided to the solar wing position estimation and control system 600, as shown in block 706. The solar wing position estimation and control system 600 computes a stepping command $\theta_{(i)w\_b}^{est}$ for the first solar wing 104N. This plot is shown in FIG. 8 as plot 806.

A second wing bias angle command $\theta^{cmd}$ 602 for the second solar wing 104S is computed, as shown in block 508 of FIG. 7. The second wing bias angle command $\theta^{cmd}$ 602 is quantized by the quantizer 603, as shown in block 710. The quantized second solar panel command is then biased by $\theta^{bias}$ to create a biased second wing bias angle command, as shown in block 712. The second solar panel bias $\theta^{bias}$ can be determined from terrestrially based processors simulating the dynamic response of the spacecraft body to the first step command, by terrestrially based testing of the dynamic response of the spacecraft body to the first step command, or can be determined by estimations derived by the SCP or by space-based testing.

The biased second wing bias angle command is provided to the solar wing position estimation and control system 600 as shown in block 714. The final solar wing stepping command $N_{(i)}^{SWD}$ is computed by the solar wing position estimation and control system 600. The resulting stepping command $\theta_{(i)w\_b}^{est}$ for the second solar wing 104S is shown as plot 806 shown in FIG. 8. Note that the angular bias $\theta_{bias}$ implements a time delay $\Delta t$ between the first solar wing 104N command and the second solar wing 104S command. This time delay $\Delta t$ is chosen to allow the spacecraft body 102 transients induced by stepping the second solar wing 104S to cancel those induced by stepping the first solar wing 104N. Although the foregoing has been described with respect to an embodiment in which the transient cancellation bias angle is applied to the second solar panel command in order to implement the time delay $\theta t$, it is noted that the present invention may also be implemented by adding a suitable bias anywhere in the estimation and control system 600 illustrated in FIG. 6A. For example, similar results can be obtained if the transient cancellation bias angle $\theta^{bias}$ is added to the solar wing 104S position (e.g. $S_{(i)}^{SWD}$) instead of $\theta_{(i)}^{cmd}$. Suitable biases may also be added elsewhere in the estimation and control loop with similar results (e.g. $\theta_{(i)b\_s}^{est}$, for example).

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing form the spirit and scope of the invention, the invention resides in the claims hereinafter appended.

What is claimed is:

1. A method of controlling a plurality of solar panels coupled to a spacecraft, comprising the steps of:
   providing a first step to the first solar panel, comprising the steps of:
     computing a first solar panel bias angular command;
     computing the first step command at least in part from the first solar panel bias angular command;
     providing the first step command to a first solar panel driver;
   providing a second step command to a second solar panel at a time of a transient zero-crossing of a dynamic response of the spacecraft body to the first step command, comprising the steps of:
   computing a second solar panel bias angular command;
   computing the second step command at least in part from the second solar panel bias angular command;
     providing the computed second solar panel bias angle command to the solar panel driver; and
     biasing a second solar panel position by a transient cancellation bias angle.

2. A method of controlling a plurality of solar panels coupled to a spacecraft, comprising the steps of:
   providing a first step command to a first solar panel, comprising the steps of
     computing a first solar panel angular command; and
     providing the computed first solar panel angular command to a first solar panel driver;
   providing a second step command to a second solar panel at a time of a transient zero-crossing of a dynamic response of the spacecraft body to the first step command, comprising the steps of
     computing a second solar panel angular command;
     biasing the computed second solar panel angular command by a transient cancellation bias angle; and
     providing the biased second solar panel angular command to a second solar panel driver;
   wherein the second solar panel is disposed on an opposite side of the spacecraft from the first solar panel.

3. The method of claim 2, wherein the first solar panel and the second solar panel are rotatable about a longitudinal axis, and at least one of the first solar panel and the second solar panel are tilted away from a spacecraft body pitch axis.

4. The method of claim 2, wherein the transient cancellation bias angle is computed at least in part from a product of a desired time lag and a Sun-tracking angular rate of the second solar panel.

5. The method of claim 2, wherein the transient cancellation bias angle is determined by terrestrially-based processors simulating to dynamic response of the spacecraft body to the first step command.

6. The method of claim 2, wherein the transient cancellation bias angle is determined from terrestrially based testing of the dynamic response of the spacecraft body to the first step command.

7. The method of claim 2, wherein the transient cancellation bias angle is estimated by a spacecraft processor.

8. The method of claim 2, wherein the transient cancellation bias angle is estimated by space-based testing of the dynamic response of the spacecraft body to the first step command.

9. The method of claim 2, wherein:
   the step of providing a first step command to the first solar panel further comprises the step of quantizing the first solar panel angular command;
   the step of biasing the computed second solar panel angular command by a transient cancellation bias angle comprises the steps of
     quantizing the second solar panel angular command;
     computing a modified solar panel angular command at least in part from the sum of the quantized second solar panel angular command and the transient cancellation bias angle.

10. The method of claim 9, wherein the first step command and the second step command are characterized by a step size, and wherein:
    the first solar panel angular command is quantized to a least significant bit equal to a step size and to a value of a nearest step;
    the second solar panel command is quantized to the least significant bit.

11. An apparatus for controlling a plurality of solar panels coupled to a spacecraft body, comprising:
    a processor;
    a first solar panel driver, communicatively coupled to the processor, for providing a first step command to a first solar panel; and
    a second solar panel driver, communicatively coupled to the processor, for providing a second step command to a second solar panel at a time of a transient zero-crossing of a dynamic response of the spacecraft body to the first step command;
    wherein:
      the second solar panel is disposed on an opposite side of the spacecraft from the first solar panel;
      the processor computes a first solar panel angular command, computes the first step command at least in part from the first solar panel angular command and provides the computed first step command to the first solar panel driver; and
      the processor computes a second solar panel angular command biases the second solar panel angular command by a transient cancellation bias angle, computes the second step command at least in part from the biased second solar panel angular command, and provides the second step command to the second solar panel driver.

12. The apparatus of claim 11, wherein the first solar panel and the second solar panel are rotatable about a longitudinal axis, and at least one of the first solar panel and the second solar panel are tilted away from a spacecraft body pitch axis.

13. The apparatus of claim 11, wherein the transient cancellation bias angle is computed at least in part from a product of a desired time lag and a Sun-tracking angular rate of the second solar panel.

14. The apparatus of claim 11, wherein the transient cancellation bias angle is determined by terrestrially-based processors simulating the dynamic response of the spacecraft body to the first step command.

15. The apparatus of claim 11, wherein the transient cancellation bias angle is determined from terrestrially based testing of the dynamic response of the spacecraft body to the first step command.

16. The apparatus of claim 11, wherein the transient cancellation bias angle is estimated by a spacecraft processor.

17. The apparatus of claim 11, wherein the transient cancellation bias angle is estimated by space-based testing of the dynamic response of the spacecraft body to the first step command.

18. The apparatus of claim 11, wherein:
the processor computes a first solar panel angular command, quantizes the first solar panel angular command, computes a first step command at least in part from the quantized first solar panel angular command and provides the computed first step command to the first solar panel driver; and
the processor computes a second solar panel angular command, quantizes the second solar panel angular command, biases the quantized second solar panel angular command by a transient cancellation bias angle, computes a second step command at least in part from the quantized biased second solar panel angular command, and provides the second step command to the second solar panel driver.

19. The apparatus of claim 18, wherein the first step command and the second step command are characterized by a step size, and wherein:
the first solar panel angular command is quantized to a least significant bit equal to a step size and to a value of a nearest step;
the second solar panel command is quantized to the least significant bit.

20. An apparatus for controlling a plurality of solar panels coupled to a spacecraft body, comprising:
a processor;
a first solar panel driver, communicatively coupled to the processor, for providing a first step command to a first solar panel; and
second solar panel driver, communicatively coupled to the processor, for providing a second step command to a second solar panel at a time of a transient zero-crossing of a dynamic response of the spacecraft body to the first step command;
wherein:
the second solar panel is disposed on an opposite side of the spacecraft from the first solar panel;
the processor computes a first solar panel angular bias command, computes the first step command at least in part from the first solar panel angular bias command and provides the computed first step command to the first solar panel driver; and
the processor computes a second solar panel angular bias command, computes the second step command at least in part from the second solar panel angular bias command, provides the second step command to the second solar panel driver, and biases the second solar panel position by a transient cancellation bias.

21. An apparatus for controlling a plurality of solar panels coupled to a spacecraft, comprising:
means for providing a first step command to a first solar panel, comprising
means for computing a first solar panel angular command;
means for providing the computed first solar panel angular command to a first solar panel driver;
means for providing a second step command to a second solar panel at a time of a transient zero-crossing of a dynamic response of the spacecraft body to the first step command, comprising
means for computing a second solar panel angular command;
means for biasing the computed second solar panel angular command by a transient cancellation bias angle;
means for providing the biased second solar panel angular command to a second solar panel driver;
wherein the second solar panel is disposed on an opposite side of the spacecraft from the first solar panel.

22. The apparatus of claim 21, wherein the first solar panel and the second solar panel is rotatable about a longitudinal axis, and at least one of the first solar panel and the second solar panel are tilted away from a spacecraft body pitch axis.

23. The apparatus of claim 21, wherein the transient cancellation bias angle is computed at least in part from a product of a desired time lag and a Sun-tracking angular rate of the second solar panel.

24. The apparatus of claim 21, wherein the transient cancellation bias angle is determined by terrestrially-based processors simulating the dynamic response of the spacecraft body to the first step command.

25. The apparatus of claim 21, wherein the transient cancellation bias angle is determined from terrestrially based testing of the dynamic response of the spacecraft body to the first step command.

26. The apparatus of claim 21, wherein the transient cancellation bias angle is estimated by a spacecraft processor.

27. The apparatus of claim 21, wherein the transient cancellation bias angle is estimated by space-based testing of the dynamic response of the spacecraft body to the first step command.

28. The apparatus of claim 21, wherein:
the means for providing a first step command to the first solar panel further comprises means for quantizing the first solar panel bias angular command;
the means for biasing the computed second solar panel angular command by a transient cancellation bias angle comprises
means for quantizing the second solar panel angular command;
means for computing a modified solar panel angular command at least in part from the sum of the quantized second solar panel angular command and the transient cancellation bias angle.

29. The apparatus of claim 28, wherein the first step command and the second step command are characterized by a step size, and wherein:
the first solar panel angular command is quantized to a least significant bit equal to a step size and to a value of a nearest step;
the second solar panel command is quantized to the least significant bit.

30. An apparatus for controlling a plurality of solar panels coupled to a spacecraft body, comprising:
means for providing a first step to the first solar panel, comprising:
means for computing a first solar panel bias angular command;
means for computing the first step command at least in part from the first solar panel bias angular command;
means for providing the first step command to a first solar panel driver;
means for providing a second step command to a second solar panel at a time of a transient zero-crossing of a dynamic response of the spacecraft body to the first step command, comprising:

means for computing a second solar panel bias angular command;

means for computing the second step command at least in part from the second solar panel bias command;

means for providing the computed second solar panel bias angle command to the solar panel driver; and means for biasing a second solar panel position by a transient cancellation bias.

* * * * *